(12) United States Patent
Iseki et al.

(10) Patent No.: US 6,645,366 B2
(45) Date of Patent: Nov. 11, 2003

(54) WASTE WATER TREATMENT DEVICE

(75) Inventors: Masahiro Iseki, Osaka (JP); Kazuo Ikegami, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/984,634

(22) Filed: Oct. 30, 2001

(65) Prior Publication Data
US 2002/0056674 A1 May 16, 2002

(30) Foreign Application Priority Data
Nov. 1, 2000 (JP) ........................................ 2000-334328

(51) Int. Cl.$^7$ ................................................ C02F 1/461
(52) U.S. Cl. ................. 205/742; 205/743; 205/744; 205/746; 205/747; 205/761; 204/263; 204/264
(58) Field of Search ................. 205/742, 743, 205/744, 746, 747, 761; 204/263, 264

(56) References Cited

U.S. PATENT DOCUMENTS

| | | | |
|---|---|---|---|
| 3,635,764 A | | 1/1972 | Setser et al ............... 136/86 |
| 3,926,754 A | * | 12/1975 | Lee ........................... 204/742 |
| 4,113,519 A | * | 9/1978 | Oka et al. .............. 148/6.15 R |

FOREIGN PATENT DOCUMENTS

| | | |
|---|---|---|
| DE | 19517652 A1 | 11/1996 |
| DE | 19819303 A1 | 11/1999 |
| EP | 0659692 A1 | 6/1995 |
| JP | 11-267683 | 10/1999 |
| JP | 2000-051894 | 2/2000 |
| WO | WO99/57062 | 11/1999 |

OTHER PUBLICATIONS

European Search Report dated Feb. 8, 2002.

* cited by examiner

*Primary Examiner*—Arun S. Phasge
(74) *Attorney, Agent, or Firm*—Armstrong, Westerman & Hattori, LLP

(57) ABSTRACT

A waste water treatment device is provided in which removal of phosphorus and removal of nitrogen can efficiently be carried out and a decrease in size of the device and a decrease in cost can be achieved. The waste water treatment device includes a waste water treatment chamber; at least one set of electrodes disposed so that at least a part of the electrodes are immersed in waste water in the waste water treatment chamber, at least one of said electrodes dissolving out, by electrolysis, iron ions or aluminum ions for precipitating and removing phosphoric acid ions in waste water; a power source for supplying an electrolytic current to the set of electrodes; a control section for controlling the power source; and a metallic catalyst which is disposed in the vicinity of at least one of the sets of electrodes and which effects a denitrifying reaction with hydrogen in waste water.

7 Claims, 2 Drawing Sheets

WASTE WATER TREATMENT DEVICE

BACKGROUND OF THE INVENTION (i) Field of the Invention

The present invention relates to a waste water treatment device for waste water containing phosphoric acid, phosphorus compounds, phosphate ions, organic nitrogen, nitrite nitrogen, nitrate nitrogen, nitrate ions, and ammonia.

(ii) Description of the Related Art

It is well known that the presence of phosphorus compounds and nitrogen compounds is one of the causes of nutrition richness of a river or lake. Besides, many phosphorus compounds and nitrogen compounds exist in waste water from homes, but a purification treatment of these compounds is difficult and no effective measure exists.

Various treatment devices for phosphorus compounds have been proposed, but as for waste water from homes, an electrolytic dissolution method of iron is known (Japanese Patent Application Laid-open No. 3-89998). This technique is a technique in which phosphate ions in waste water are reacted with iron ions, and condensed and precipitated to be removed as water-insoluble salts such as $FePO_4$ and $Fe(OH)_x(PO_4)_y$, and an iron electrode disposed in an electrolytic bath is electrified to dissolve out iron ions. Furthermore, as a waste treatment device using such an electrochemical elution method of iron, for example, there is a device that comprises an anaerobic bath, an aerobic bath, and a treatment water bath. In this kind of device, waste water in the treatment water bath is circulated through the anaerobic bath via the treatment bath in which iron ions to react with phosphoric acid ions are dissolved out.

In the anaerobic bath, denitrifying bacteria live that exist only in this anaerobic bath, and therefore, nitrate ions and nitrite ions in circulated waste water are reduced into nitrogen gas, thereby removing nitrogen from the waste water. However, in the denitrifying reaction by the above-mentioned denitrifying bacteria, reaction time is long, and hence, there is a problem of decreased treatment efficiency. In addition, to keep sufficient denitrifying bacteria, an anaerobic bath having a large volume is required, and so there are problems of an increase in equipment cost and an increase in an equipment disposition area. Further, since the denitrifying bacteria deteriorate in action especially in winter, there are problems that the denitrifying action deteriorates and the treatment efficiency becomes instable.

Therefore, to solve the above-described technical problems, as shown in FIG. 2, there is a contact reduction treatment in which hydrogen is fed from a hydrogen cylinder (not shown) into the anaerobic bath 100 via a gas scattering plate 101, and a reducing catalyst 102 is used as a catalyst in the presence of the $H_2$ gas. On the basis of this treatment, a method in which the denitrifying treatment is performed stably and efficiently has been provided. In addition, a method of using a metallic reaction of zinc or the like in an alkali solution has also be provided.

In the above various denitrifying treatments, however, there are problems that the device is complicated and an increase in cost exists. Moreover, there is also a method of adding a necessary agent for pH control, but the method has a problem of maintenance.

SUMMARY OF THE INVENTION

Accordingly, the present invention has been developed in order to solve the conventional technical problems, and an object of the present invention is to provide a waste water treatment device in which removal of phosphorus and removal of nitrogen can efficiently be carried out and a decrease in the size of the device and a decrease in cost can be achieved.

A waste water treatment device of the present invention is characterized by comprising a waste water treatment chamber; at least one set of electrodes disposed so that at least part is immersed in waste water in the waste water treatment chamber, at least one of which dissolves out by electrolysis iron ions or aluminum ions for precipitating and removing phosphoric acid ions in waste water; a power source for supplying an electrolytic current to the set of electrodes; a control section for controlling the power source; and a metallic catalyst disposed in the vicinity of at least one electrode of the set of electrodes effect on the denitrifying reaction with hydrogen generated from the electrode in waste water.

According to the present invention, there are provided a waste water treatment chamber; at least one set of electrodes disposed so that at least a part of the electrodes are immersed in waste water in the waste water treatment chamber, at least one of the above electrodes dissolving out, by electrolysis, iron ions or aluminum ions for precipitating and removing phosphoric acid ions in waste water; a power source for supplying an electrolytic current to the set of electrodes; a control section for controlling the power source; and a metallic catalyst which is disposed in the vicinity of at least the other of the set of electrodes and which effects a denitrifying reaction with hydrogen in waste water. Therefore, on the electrode side on which iron ions or aluminum ions are dissolved out by electrolysis, precipitation and removal of phosphoric acid ions can be performed, and on the other electrode side, removal of nitrogen can be performed by the metallic catalyst that effects the denitrifying reaction by hydrogen generated from the electrode, and therefore the removal of phosphorus and the removal of nitrogen can be performed together.

Since the waste water treatment device according to the present invention is constituted by a waste water accommodation chamber, at least one set of electrodes, the control section, and the metallic catalyst, the device becomes simple and a decrease in size of device and a decrease in cost result. Further, in the waste water treatment device according to the present invention, since any biological catalyst, which is used for a denitrifying reaction, and any chemical for controlling pH in the waste water accommodation bath, as conventional, are not used, the treatment of waste water can be performed without being affected by the environment in which the waste water treatment is performed.

In comparison with the conventional waste water treatment device, the amount of mud generated after treatment can remarkably be decreased.

In addition to the above invention, the waste water treatment device of the present invention is characterized in that both of the sets of electrodes are used as electrodes for dissolving out by electrolysis iron ions or aluminum ions for precipitating and removing phosphoric acid ions in waste water, the metallic catalyst is disposed in the vicinity of each electrode, and by periodically reversing the polarities of the electrodes by the control section, removal of phosphoric acid ions by iron ions or aluminum ions is performed on the electrode side whose polarity is anode, and removal of nitrogen by a denitrifying reaction by hydrogen generated from the electrode is performed under the metallic catalyst on the electrode side whose polarity is cathode.

In another embodiment, both of the set of electrodes are used as electrodes for dissolving out, by electrolysis, iron ions or aluminum ions for precipitating and removing phosphoric acid ions in waste water; the metallic catalyst is disposed in the vicinity of each electrode; and the polarities of the electrodes are periodically reversed by the control section to carry out the removal of phosphoric acid ions by iron ions or aluminum ions on the side of the electrode whose polarity is anode and to carry out the removal of nitrogen by a denitrifying reaction with hydrogen generated from the electrode in the presence of the metallic catalyst on the side of the electrode whose polarity is cathode. Since the electrodes are periodically reversed in polarity, the inconvenience that only one electrode is dissolved out and the electrode is used up or inactivated can be avoided.

A waste water treatment method of the present invention is characterized by comprising at least one set of electrodes disposed in a waste water treatment chamber so that at least part is immersed in waste water, at least one of which dissolves out by electrolysis iron ions or aluminum ions for precipitating and removing phosphoric acid ions in waste water; a control section for supplying an electrolytic current to the set of electrodes and controlling the electrolytic current; and a metallic catalyst disposed in the vicinity of at least the other of the set of electrodes to effect the denitrifying reaction by hydrogen generated from the electrode in waste water.

According to this invention, at least one set of electrodes is disposed in a waste water treatment chamber so that at least a part of the electrodes are immersed in waste water, at least one of the electrodes dissolving out, by electrolysis, iron ions or aluminum ions for precipitating and removing phosphoric acid ions in waste water; a control section is disposed for supplying an electrolytic current to the set of electrodes and for controlling the electrolytic current; and a metallic catalyst is disposed which is provided in the vicinity of at least one of the sets of electrodes and which effects a denitrifying reaction with hydrogen generated from the electrode in waste water. Therefore, on the side of the electrode on which iron ions or aluminum ions are dissolved out by electrolysis, precipitation and removal of phosphoric acid ions can be performed, and on the other electrode side, removal of nitrogen can be performed by the metallic catalyst that effects the denitrifying reaction by hydrogen generated from the electrode, and so the removal of phosphorus and the removal of nitrogen can be performed together.

In the waste water treatment method according to this invention, since any biological catalyst, which is used for a denitrifying reaction, and any chemical for controlling pH in the waste water accommodation bath, as conventional, are not used, the treatment of waste water can be performed without being affected by the environment in which the waste water treatment is performed.

In comparison with the conventional waste water treatment method, the amount of mud generated after treatment can remarkably be decreased.

In each embodiment described above, the present invention is characterized in that the electrodes are made of a noble metal modified with copper atoms, or copper.

According to this invention, in addition to each invention described above, since the metallic catalyst is made of a noble metal modified with copper atoms or copper, on the electrode side at which iron ions or aluminum ions are dissolved out by electrolysis, precipitation and removal of phosphoric acid ions can be performed, and on the other electrode side, the removal efficiency of nitrogen can be improved when removal of nitrogen is performed by the metallic catalyst that effects the denitrifying reaction by hydrogen generated from the electrode.

Still further, in addition to each invention described above, the present invention is characterized in that a diaphragm is provided between the electrodes.

According to this invention, in addition to each invention described above, since the diaphragm is provided between the electrodes, the removal efficiency of nitrogen by the denitrifying reaction can be improved further.

DETAILED DESCRIPTION OF THE PREFERRED EMBODIMENT

Figure 1:
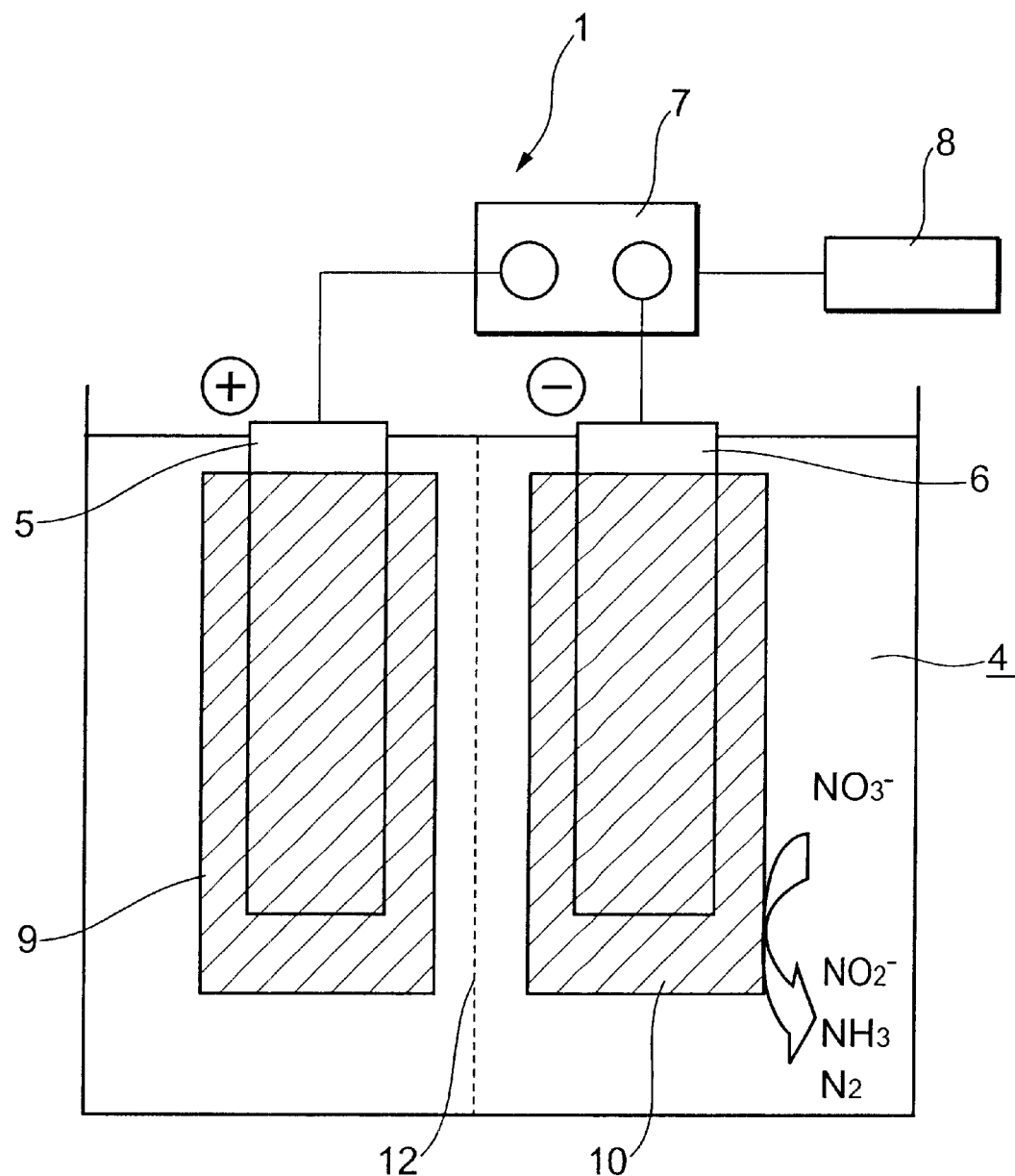
FIG. 1 is a construction explanatory view of a waste water treatment device as an embodiment to which the present invention is applied.
Figure 2:
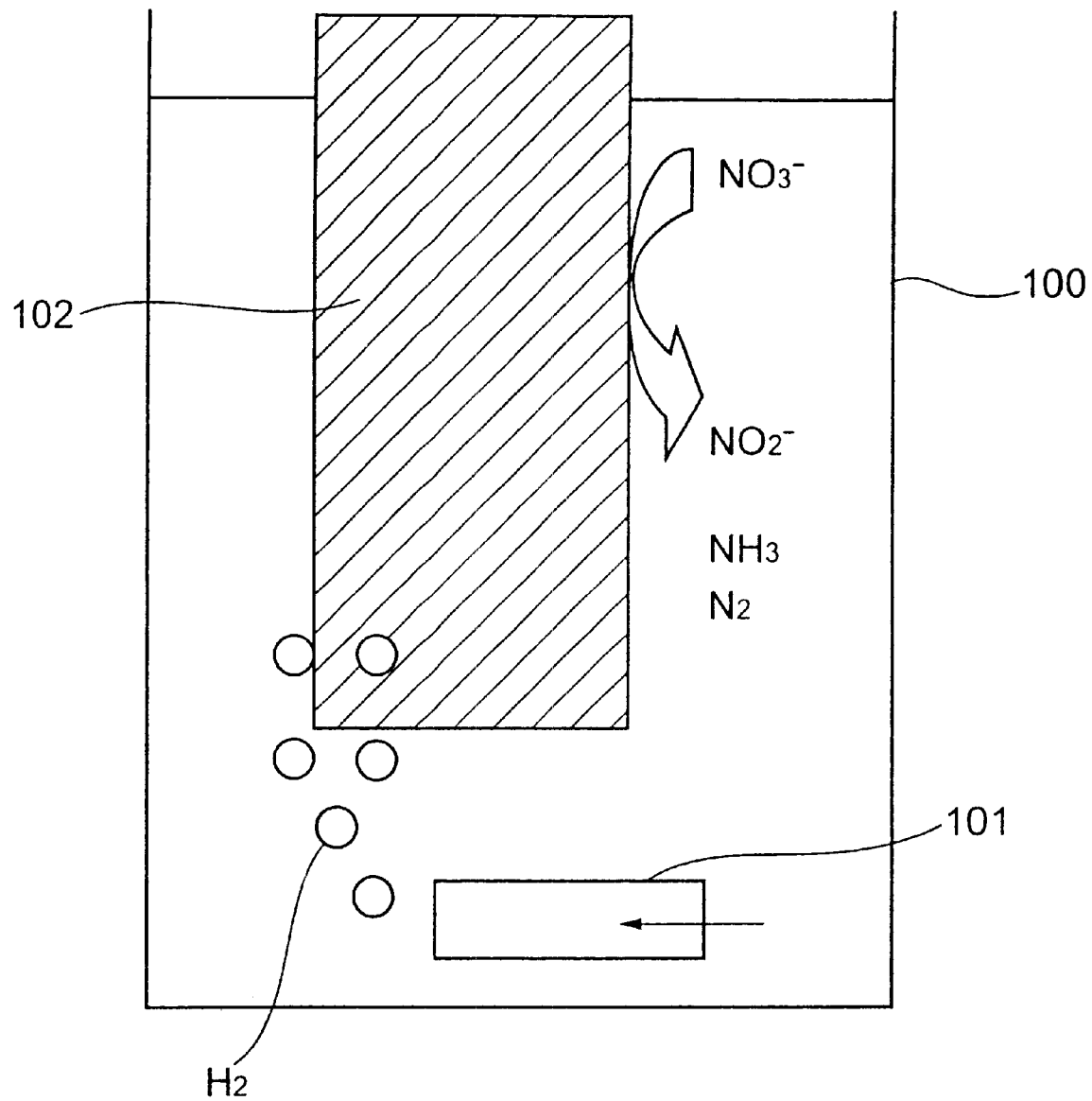
FIG. 2 is a construction explanatory view of a conventional waste water treatment device.

Hereinafter, an embodiment of the present invention will be described in detail with reference to FIG. 1. A waste water treatment device 1 of the present invention is made up from a waste water treatment chamber 4 having a flow inlet (not shown) and a flow outlet (not shown) for waste water, a pair of electrodes 5 and 6 disposed so that at least part of each of them is immersed in waste water in the treatment chamber 4 and which are opposed to each other, a power source 7 for electrifying the electrodes 5 and 6, a control unit 8 for controlling the power source 7, and metallic catalysts 9 and 10 disposed in the vicinity of the respective electrodes 5 and 6. The metallic electrodes 9 and 10 are made of, e.g., an alloy of platinum and copper. Each of the metallic electrodes 9 and 10 is formed into, e.g. a cylindrical shape. Each of the metallic electrodes 9 and 10 is formed into a net for enlarging the contact area with nitrate ions, nitrite ions, or ammonium in waste water. Although the metallic catalysts made of an alloy of platinum and copper in particular for improving the efficiency of a denitrifying reaction are used in this embodiment, other metallic catalysts may be used.

The above-described control unit 8 can control the voltage applied from the power source 7 to the electrodes 5 and 6, and it reverses the polarities of the electrodes 5 and 6 periodically, for example, each day in this embodiment.

Each of the above-described electrodes 5 and 6 is a soluble electrode made of an iron ions and/or aluminum ions generation source such as iron, an iron alloy, aluminum, an aluminum alloy, or an iron-aluminum alloy. If the polarities of the electrodes are not reversed by the control unit 8 in this embodiment, one electrode, for example, the electrode 6 may be an insoluble electrode made of an insoluble metal such as platinum, gold, titanium, or carbon.

In FIG. 1, of the electrodes 5 and 6, the electrode 5 is the electrode on the anode side and the electrode 6 is the electrode on the cathode side. By this, on the anode side electrode 5, when the electrode 5 is made of iron, iron ions are dissolved out from the electrode 5. By this, phosphate ions or hydroxide ions contained in waste water accommodated in the waste water treatment chamber 4 condense and react and iron ions dissolved out from the electrode 5 to generate iron phosphate or iron hydroxide.

Although the treatment by the electrolytic dissolution method of iron in phosphate ions-containing waste water utilizes a reaction (reaction A) in which iron ions dissolved out from the electrode 5 react with phosphate ions in waste water to generate water-insoluble salts of phosphoric acid and iron, hydroxide ions exist in waste water and iron ions dissolved can react also with hydroxide ions (reaction B). Since the reaction B is faster than the reaction A, to remove phosphate ions, the quantity of current must be increased to increase the released quantity of iron ions.

However, if calcium ions or magnesium ions exist in waste water, those ions react with hydroxide ions (reaction D). Since this reaction D is prior to the reaction B between iron ions and hydroxide ions, the reaction B is suppressed and iron ions are utilized efficiently in the reaction A with phosphate ions. Further, since calcium ions and magnesium ions also react with phosphate ions to generate water-insoluble salts, they contribute to the removal of phosphate ions.

For this purpose, in the present invention, it is also possible that calcium ions or magnesium ions are added, the reaction B between iron ions and hydroxide ions is suppressed, and the reaction A between iron ions and phosphate ions is efficiently performed. By this, the quantity of electrification can be reduced, and power saving can be performed and the quantity of dissolution of iron can be reduced. Incidentally, although the description is made in this embodiment assuming that the electrode 5 is iron, it may be made of aluminum.

On the other hand, on the cathode side electrode 6, when electrified by the power source 7, hydrogen is generated from the surface of the electrode 6. Therefore, on the cathode side electrode 6, nitrate ions in waste water react with hydrogen generated from the surface of the electrode 6 under the above-described metallic catalyst 10, and is reduced to nitrite ions or nitrogen gas by a denitrifying action. Nitrite ions that have not changed to nitrogen further react with hydrogen under the metallic catalyst 10 to change into nitrogen.

By this, on the electrode 5 side wherein iron ions or aluminum ions are dissolved out by electrolysis, the precipitation and removal of phosphoric acid ions can be performed, and on the other electrode 6 side, the removal of nitrogen can be performed by the metallic catalyst 10 that effects the denitrifying reaction by hydrogen, and the removal of phosphorus and the removal of nitrogen can be performed together.

Since the waste water treatment device 1 according to the present invention is made up from the waste water accommodation chamber 4, the electrodes 5 and 6, the power source 7, the control unit 8, and the metallic catalysts 9 and 10, the device becomes extremely simple and a decrease in size of a device and a decrease in cost can be achieved. Further, in the waste water treatment device 1 according to the present invention, since any biological catalyst, which is used for a denitrifying reaction, and any chemical for controlling pH in the waste water accommodation bath, as conventional, are not used, the treatment of waste water can be performed without being affected by the environment in which the waste water treatment is performed, and the maintenance can be simplified.

In comparison with the conventional waste water treatment device, the amount of mud generated after treatment can remarkably be decreased. The treatment of waste water can extremely suitably be performed.

When the polarity of the voltage applied from the power source 7 to the electrodes 5 and 6 is periodically reversed, the polarities of the respective electrodes 5 and 6 become reverse to the above, that is, the electrode 6 is the electrode on the anode side and the electrode 5 is the electrode on the cathode side. By this, on the anode side electrode 6, iron ions are dissolved out from the electrode 6. Phosphate ions or hydroxide ions contained in waste water accommodated in the waste water treatment chamber 4 condense and react and iron ions dissolved out from the electrode 6 generate iron phosphate or iron hydroxide, and phosphate ions can be removed from waste water.

On the other hand, on the cathode side electrode 5, when electrified by the power source 7, hydrogen is generated from the surface of the electrode 5. Therefore, on the cathode side electrode 5, nitrate ions in waste water react with hydrogen generated from the surface of the electrode 5 under the above-described metallic catalyst 9, and is reduced to nitrite ions or nitrogen gas by a denitrifying action. Besides, nitrite ions that have not changed to nitrogen further react with hydrogen under the metallic catalyst 9 to change into nitrogen.

By this, on the electrode 6 side wherein iron ions or aluminum ions are dissolved out by electrolysis, the precipitation and removal of phosphoric acid ions can be performed, and on the other electrode 5 side, the removal of nitrogen can be performed by the metallic catalyst 9 that effects the denitrifying reaction by hydrogen, and the removal of phosphorus and the removal of nitrogen can be performed together.

As described above, the metallic catalysts 9, 10 are disposed in the vicinity of the electrodes 5, 6, respectively, and the polarities of the electrodes 5, 6 are periodically reversed by the control unit 8, whereby on the side of the electrode whose polarity becomes anode, the removal of phosphoric acid ions by iron ions or aluminum ions is carried out, and on the side of the electrode whose polarity becomes cathode, the removal of nitrogen by the denitrifying reaction with hydrogen is carried out in the presence of the metallic catalyst 9 or 10. Accordingly, since the polarities of the electrodes 5, 6 are periodically reversed by the control unit 8, an inconvenience can be avoided where one electrode only works for the dissolution and is early used up or inactivated. Therefore, since exchange of the electrode need not be performed until both the electrodes 5 and 6 have been used up, maintenance is simplified.

The reference numeral 12 in FIG. 1 denotes a diaphragm. By providing the diaphragm 12, in addition to the above-described embodiment, the removal efficiency of nitrogen by the denitrifying reaction can be improved. Furthermore, in the above embodiment, each of the electrodes 5 and 6 is made of an iron ions and/or aluminum ions generation source such as iron, an iron alloy, aluminum, an aluminum alloy, or an iron-aluminum alloy. The metallic catalyst is made of a noble metal modified with copper atoms or copper. In such a case, the removal efficiency of nitrogen by the denitrifying reaction can be improved further.

The wastewater treatment device 1 of the present invention can effectively be utilized in particular for general home waste water. Therefore, although it may be used solely, in a combination with another purification system, for example, an activation mud method, a diaphragm separation method, an anaerobic/aerobic circulation method, or the like, it can be an integrated waste water purification system for a home or for a congregate house. It can also be utilized for a large-scale treatment system (sewage disposal plant).

As described above in detail, according to the present invention, since the waste water treatment chamber, at least one set of electrodes disposed so that at least part is immersed in waste water in this waste water treatment chamber, at least one of which dissolves out by electrolysis iron ions or aluminum ions for precipitating and removing phosphoric acid ions in waste water, a power source for supplying an electrolytic current to the set of electrodes, a control section for controlling the power source, and a metallic catalyst disposed in the vicinity of at least one of the set of electrodes effect the denitrifying reaction by hydrogen in waste water, are provided, on the electrode side at which iron ions or aluminum ions are dissolved out by electrolysis, precipitation and removal of phosphoric acid ions can be performed, and on the other electrode side, removal of nitrogen can be performed by the metallic catalyst that acts on the denitrifying reaction by hydrogen generated from the electrode, and so the removal of phosphorus and the removal of nitrogen can be performed together.

Since the waste water treatment device according to the present invention is constituted by a waste water accommodation chamber, at least one set of electrodes, the control section, and the metallic catalyst, the device becomes simple and a decrease in the size of device and a decrease in cost can be achieved. Further, in the waste water treatment device according to the present invention, since any biological catalyst, which is used for a denitrifying reaction, and any chemical for controlling pH in the waste water accommodation bath, as conventional, are not used, the treatment of waste water can be performed without being affected by the environment in which the waste water treatment is performed.

In comparison with the conventional waste water treatment device, the amount of mud generated after treatment can remarkably be decreased.

Further, according to the present invention, in addition to the above, since both of the sets of electrodes are used as electrodes for dissolving out by electrolysis iron ions or aluminum ions for precipitating and removing phosphoric acid ions in waste water, the metallic catalyst is disposed in the vicinity of each electrode, and by periodically reversing the polarities of the electrodes by the control section, the removal of phosphoric acid ions by iron ions or aluminum ions is performed on the electrode side whose polarity is anode, and the removal of nitrogen by a denitrifying reaction by hydrogen generated from the electrode is performed under the metallic catalyst on the electrode side whose polarity is cathode, since the set of electrodes are periodically reversed in polarity of the electrode, the inconvenience that only one electrode is dissolved out and the electrode is used up early or inactivated can be avoided.

According to the present invention, since at least one set of electrodes disposed in a waste water treatment chamber so that at least part is immersed in waste water, at least one of which dissolves out by electrolysis iron ions is or aluminum ions for precipitating and removing phosphoric acid ions in waste water, a control section for supplying an electrolytic current to the set of electrodes and controlling the electrolytic current, and a metallic catalyst disposed in the vicinity of at least one of the sets of electrodes to act on the denitrifying reaction by hydrogen generated from the electrode in waste water, are provided, on the electrode side at which iron ions or aluminum ions are dissolved out by electrolysis, precipitation and removal of phosphoric acid ions can be performed, and on the other electrode side, removal of nitrogen can be performed by the metallic catalyst that effects the denitrifying reaction by hydrogen generated from the electrode, and so the removal of phosphorus and the removal of nitrogen can be performed at once.

In the waste water treatment method according to this invention, since any biological catalyst, which is used for a denitrifying reaction, and any chemical for controlling pH in the waste water accommodation bath, as conventional, are not used, the treatment of waste water can be performed without being affected by the environment in which the waste water treatment is performed.

In comparison with the conventional waste water treatment method, the amount of mud generated after treatment can remarkably be decreased.

According to the present invention, in addition to each invention described above, since the electrode is made of a noble metal modified with copper atoms or copper, on the electrode side at which iron ions or aluminum ions are dissolved out by electrolysis, precipitation and removal of phosphoric acid ions can be performed, and on the other electrode side, the removal efficiency of nitrogen can be improved when removal of nitrogen is performed by the metallic catalyst that effects the denitrifying reaction by hydrogen generated from the electrode.

Further, according to the present invention, in addition to each invention described above, since the diaphragm is provided between the electrodes, the removal efficiency of nitrogen by the denitrifying reaction can be improved further.

What is claimed is:

1. A waste water treatment device comprising
   a waste water treatment chamber; at least one set of electrodes disposed so that at least a part of the electrodes are immersed in waste water in the waste water treatment chamber, at least one of said electrodes dissolving out, by electrolysis, iron ions or aluminum ions for precipitating and removing phosphoric acid ions in the waste water;
   a power source for supplying an electrolytic current to the set of electrodes;
   a control section for controlling the power source; and
   a metallic catalyst disposed in the vicinity of at least one electrode of the set of electrodes and which effects a denitrifying reaction between nitrate ions and hydrogen in the waste water.

2. The waste water treatment device according to claim 1 wherein both electrodes of the set of electrodes are used as electrodes for dissolving out, by electrolysis, iron ions or aluminum ions for precipitating and removing phosphoric acid ions in waste water;
   the metallic catalyst is disposed in the vicinity of each electrode; and
   the polarities of the electrodes are periodically reversed by the control section to carry out the removal of phosphoric acid ions by iron ions or aluminum ions on the side of the electrode whose polarity is anode, and to carry out the removal of nitrogen by a denitrifying reaction with hydrogen generated from the electrode in the presence of the metallic catalyst on the side of the electrode whose polarity is cathode.

3. The waste water treatment device according to claim 1 or 2, wherein the metallic catalyst is made of a noble metal modified with a copper atoms or copper.

4. The waste water treatment device according to claims 1 or 2, wherein a diaphragm is disposed between the electrodes.

5. A waste water treatment method comprising the steps of:
   disposing at least one set of electrodes in a waste water treatment chamber so that at least a part of the electrodes are immersed in waste water, at least one of said electrodes dissolving out, by electrolysis, iron ions or aluminum ions for precipitating and removing phosphoric acid ions in waste water;

disposing a control section for supplying an electrolytic current to the set of electrodes and for controlling the electrolytic current; and disposing a metallic catalyst in the vicinity of at least the of the one electrode of the set of electrodes, said metallic catalyst acting on a denitrifying reaction with hydrogen generated from the electrode in waste water.

6. The waste water treatment method according to claim 5, wherein the metallic catalyst is made of a noble metal modified with copper atoms or copper.

7. The waste water treatment method according to claims 5, wherein a diaphragm is disposed between the electrodes.

* * * * *